(No Model.) 2 Sheets—Sheet 1.
T. T. A. HANSEN.
CENTRIFUGAL SEPARATOR.

No. 434,130. Patented Aug. 12, 1890.

Witnesses
Poul Petersen
Lauritz Nielsen

Inventor
Thorvald Tage Agaton Hansen
per Viggo Constantin-Eberth
Attorney (No Model.) 2 Sheets—Sheet 2.
T. T. A. HANSEN.
CENTRIFUGAL SEPARATOR.

No. 434,130. Patented Aug. 12, 1890.

UNITED STATES PATENT OFFICE.

THORVALD TAGE AGATON HANSEN, OF COPENHAGEN, DENMARK.

CENTRIFUGAL SEPARATOR.

SPECIFICATION forming part of Letters Patent No. 434,130, dated August 12, 1890.

Application filed July 7, 1888. Serial No. 279,336. (No model.) Patented in England May 1, 1888, No. 6,487; in Belgium May 15, 1888, No. 81,661; in France July 5, 1888, No. 190,328; in Italy August 11, 1888, No. 23,788; in Finland September 15, 1888, No. 317; in Norway September 26, 1888, No. 958; in Austria-Hungary December 26, 1888, No. 28,507 and No. 44,709, and in Sweden January 10, 1889, No. 1,687.

*To all whom it may concern:*

Be it known that I, THORVALD TAGE AGATON HANSEN, a subject of the King of Denmark, and residing at Copenhagen, in the Kingdom of Denmark, have invented certain new and useful Improvements in Centrifugal Separators, (for which patents have been granted to me in the following countries: Sweden, No. 1,687, January 10, 1889; Norway, No. 958, September 26, 1888; England, No. 6,487, May 1, 1888; France, No. 190,328, July 5, 1888; Belgium, No. 81,661, May 15, 1888; Austria-Hungary, Nos. 28,507 and 44,709, December 26, 1888; Finland, No. 317, September 15, 1888, and Italy, No. 23,788, August 11, 1888;) and I do hereby declare the following to be a full, clear, and exact description of the invention, such as will enable others skilled in the art to which it appertains to make and use the same.

This invention relates to centrifugal apparatus chiefly designed for separating milk from cream.

In order to enable the invention to be fully understood, I will describe how it can be carried into practice by reference to the accompanying drawings, in which—

Figure 1:
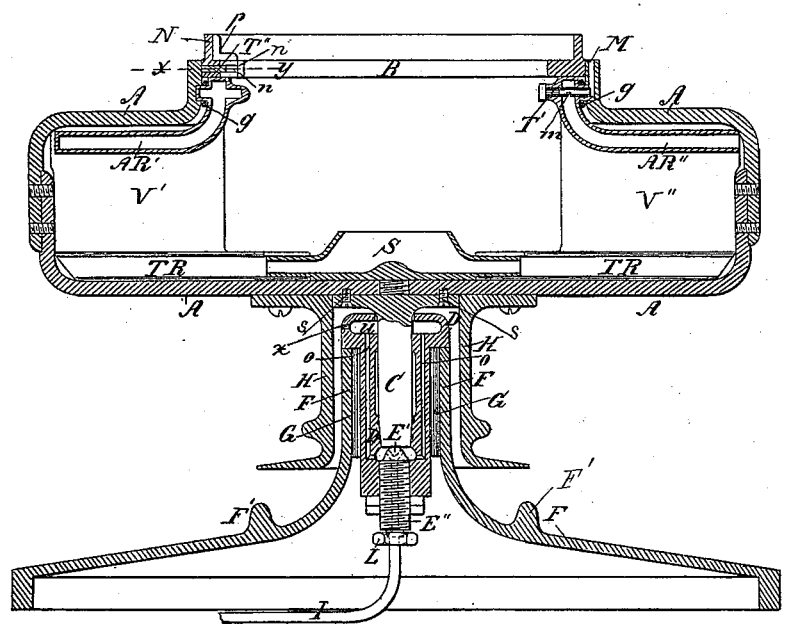
Figure 2:
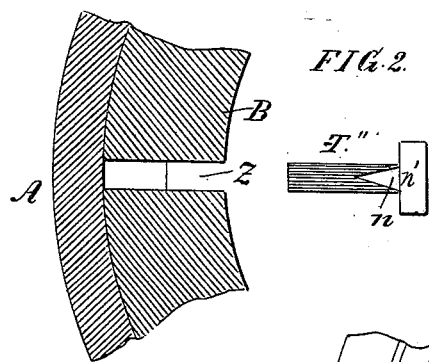
Figure 3:
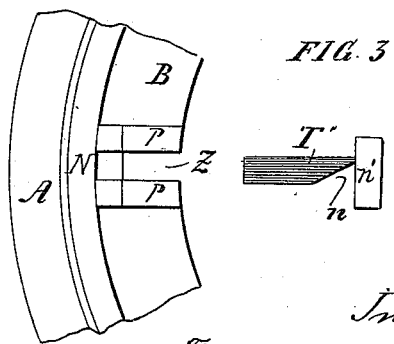
Figure 4:
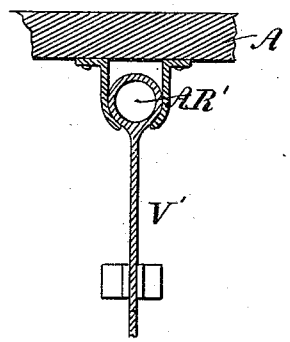
Figure 5:
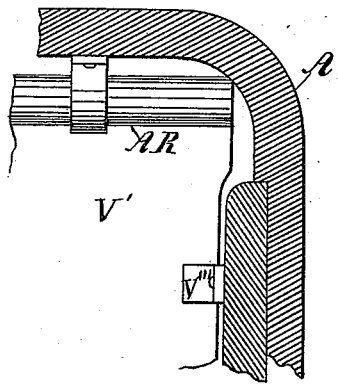
Figure 6:
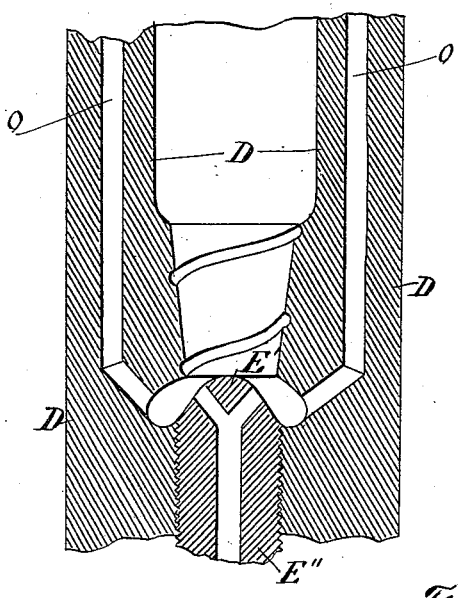

Figure 1 is a vertical section of a centrifugal apparatus constructed according to this invention. Fig. 2 is a horizontal section on the line $x\,y$ of Fig. 1. Fig. 3 shows a modification of the pin T''. Fig. 4 shows the wing V' with the tube A R'. Fig. 5 shows a side view of the wing V'. Fig. 6 shows a vertical section through the bush D.

The improved apparatus comprises a drum A and a stand F, having a bush D. The drum A, which may be made of two pieces riveted together, as shown in the drawings, (or of a single piece,) is provided at the bottom with a flanged spindle C. The spindle-flange bears upon or supports the bottom of the drum, and screws $s\,s$ are passed through the flange into the bottom of the drum to secure the same together. A hollow boss or pulley H is placed over or around the flange and is fastened to the bottom of the drum by screws. In the neck of the drum a bronze ring B is placed projecting inward toward the center, and thereby serving to confine the cream and only allow it to pass through an opening Z, Fig. 2, which is continued up to the top of the drum by two cheeks $p$, so that the cream, passing through the openings Z, must keep between these cheeks without being able to extend along the periphery of the drum over the ring B, and therefore can only escape or flow out over the edge of the drum on the portion N between the cheeks $p$. In the opening Z is inserted a pin T'', which, as shown in Fig. 2, consists of a cylindric body provided with a head N'. In the body of the pin is a wedge-shaped opening or vent $n$, the size of which regulates the quantity of the outflowing cream.

Instead of making a passage through the pin T'', as shown in the drawings, Fig. 2, a tapered notch can be formed on the side of the same, Fig. 3.

By using pins having notches of varying size the outflow, and thereby the quality, of the cream can be regulated. In the drum are placed two loose vanes or wings V', Figs. 4 and 5, and V'', each of which is cast in one piece with tubes A R' and A R'', respectively, above, and with inlet-tubes T R below. The latter tubes are connected with a vessel S, placed on the bottom of the drum, in which vessel the milk to be treated is placed. The vanes or wings are placed between studs V''' on the side of the drum and are kept in position by centrifugal force. As will be seen by reference to Fig. 1, only one of the upper tubes—namely, that which is fixed on the wing V''—is open, and the other tube is closed, and is only provided for the sake of equilibrium. Through the tube A R'' a hole is made, in which a hollow pin T' is placed, the interior of which communicates with the interior of the said tube by means of a peripheral hole $m$, thus forming a communication between the tube and a passage M in the neck of the drum, out of which the milk flows after it has been treated. By using pins T' with larger or smaller openings $m$, the outflow of the milk, and thereby the degree of purity of the cream, can be regulated. An india-rubber ring $g$ is placed between the tubes A R' A R'' and the side of the drum.

In order to allow the interior of the drum to be cleaned, the vessel S is taken out, after which the wings V' V'' can be removed, and all the parts can then be properly cleaned. The bush D on the stand F is made of hard phosphor-bronze. In the bottom of the bush is fixed a cast-steel screw E'', the upper end E' of which is formed into a hardened rounded cone. A channel is formed through this screw for the passage of oil, the channel branching outward at the top. In the lower part of the screw is fixed an oil-tube I. The screw E'' is held in its place by two lock-nuts. A part of the interior of the bush is made somewhat conical, as shown in Fig. 1, and is provided with a left-handed thread or spiral channel, Fig. 6. In the middle of the bush is an opening, and the upper part of the interior is cylindrical, (but can also be made conical.) When the spindle C rotates, it will draw the oil up into the upper oil-holder U, from which three vertical channels O conduct the oil down again, so that the oil is caused to constantly flow up and down, fresh oil being supplied through the tube I. The oil as it is used runs out at $x$, and is collected on the stand F and retained there by means of a flange F'.

The bush D is supported on the stand F by its upper part, and is only supported at the sides by the rubber ring G.

What I claim, and desire to secure by Letters Patent of the United States, is—

In a milk and cream separator, the combination of the drum with the ring B, located in the neck of the drum and having the cream outflow opening, and the regulating-pin T'' in said opening, said pin being cut away to form an outlet decreasing in width toward the periphery of the drum, substantially as described.

In testimony whereof I affix my signature in presence of two witnesses.

THORVALD TAGE AGATON HANSEN.

Witnesses:
LAURITZ NIELSEN,
PAUL PETERSEN.